United States Patent
Walls et al.

(10) Patent No.: US 7,298,755 B2
(45) Date of Patent: Nov. 20, 2007

(54) APPARATUS AND METHOD FOR COMMUNICATING WITH A NETWORK AND FOR MONITORING OPERATIONAL PERFORMANCE OF THE APPARATUS

(75) Inventors: Jeffrey Joel Walls, Fort Collins, CO (US); Michael T Hamilton, Fort Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1040 days.

(21) Appl. No.: 10/361,747

(22) Filed: Feb. 8, 2003

(65) Prior Publication Data

US 2004/0156363 A1   Aug. 12, 2004

(51) Int. Cl.
*H04L 12/28* (2006.01)
*H04L 12/56* (2006.01)
*H04L 12/26* (2006.01)

(52) U.S. Cl. .................. 370/414; 370/217; 370/418

(58) Field of Classification Search .............. None
See application file for complete search history.

(56) References Cited

U.S. PATENT DOCUMENTS

| | | | |
|---|---|---|---|
| 4,475,192 A | 10/1984 | Fernow et al. | |
| 4,933,932 A | 6/1990 | Quinquis et al. | |
| 4,964,119 A * | 10/1990 | Endo et al. ............... | 370/237 |
| 5,016,248 A | 5/1991 | Kudoh | |
| 5,291,482 A | 3/1994 | McHarg et al. | |
| 5,303,302 A | 4/1994 | Burrows | |
| 5,610,914 A | 3/1997 | Yamada | |
| 5,701,427 A | 12/1997 | Lathrop | |
| 5,802,058 A | 9/1998 | Harris et al. | |
| 6,128,295 A | 10/2000 | Larsson et al. | |
| 6,212,165 B1 | 4/2001 | Mann et al. | |
| 6,215,763 B1 * | 4/2001 | Doshi et al. ............... | 370/216 |
| 6,266,701 B1 | 7/2001 | Sridhar et al. | |
| 6,327,677 B1 | 12/2001 | Garg et al. | |
| 6,400,695 B1 | 6/2002 | Chuah et al. | |
| 6,408,005 B1 * | 6/2002 | Fan et al. ................... | 370/412 |
| 6,445,717 B1 | 9/2002 | Gibson et al. | |
| 6,446,028 B1 | 9/2002 | Wang | |
| 6,539,431 B1 | 3/2003 | Sitaraman et al. | |

OTHER PUBLICATIONS

Adamson, et al.,NACK-Oriented Reliable Multicast (NORM) Protocol Building Blocks, Proceedings of the Fourty-Ninth Internet Engineering Task Force (Jul. 2000) < http://www.ietf.org/proceedings/00dec/1-D/draft-ietf-rmt-morm-bb-00.txt.

Adamson, et al.,NACK-Oriented Reliable Multicast Protocol (NORM), Proceedings of the Fourty-Ninth Internet Engineering Task Force (Nov. 2000) < http://www.ietf.org/proceedings/00dec/1-D/draft-letf-rmt-morm-00.txt.

* cited by examiner

*Primary Examiner*—Ron Abelson (57) ABSTRACT

An apparatus for communicating with a network comprises a data packet pipeline and a monitoring element. The data packet pipeline is configured to transfer data between a buffer and a network socket. The monitoring element is configured to provide an indication of an operational performance parameter for at least one component of the data packet pipeline thereby enabling an operational problem within the pipeline may be isolated based on the indication.

30 Claims, 8 Drawing Sheets

FIG. 11

US 7,298,755 B2

APPARATUS AND METHOD FOR COMMUNICATING WITH A NETWORK AND FOR MONITORING OPERATIONAL PERFORMANCE OF THE APPARATUS

RELATED ART

In some communication systems, such as networked graphical rendering systems, for example, large amounts of data are transmitted from a transmitting unit through a network to at least one receiving unit. For example, a graphics application at a transmitting unit may transmit graphical data to at least one remote receiving unit that renders the graphical data to form a rendered image. In such a system, communication of large amounts of graphical data at a relatively high transmission rate may be needed in order to provide a suitable frame rate for the rendered image.

Performance of a system's transmitting and receiving units in transmitting data to and receiving data from a network is typically an important factor in whether graphical data can be successfully rendered via a remote receiving unit at suitable frame rates. Unfortunately, achieving a suitable transmission rate for the data communicated from the transmitting unit to the receiving unit or units can sometimes be problematic, particularly in instances where a large number of receiving units are to receive the graphical data. In such situations, the transmitting unit may be configured to transmit each graphics command multiple times through the network (e.g., once for each destination receiving unit that is to receive the command). The multiple transmissions of the graphics commands can significantly increase the amount of data that is to be communicated through the network.

SUMMARY OF THE INVENTION

Thus, techniques for enhancing the performance and ensuring adequate performance of the transmitting and receiving units are generally desirable. Generally, embodiments of the present invention provide an apparatus and method for communicating with a network and for monitoring operational performance of the apparatus.

An exemplary apparatus in accordance with one embodiment of the present invention comprises a data packet pipeline and a monitoring element. The data packet pipeline is configured to transfer data between a buffer and a, network socket. The monitoring element is configured to provide an indication of an operational performance parameter for at least one component of the data packet pipeline thereby enabling an operational problem within the pipeline may be isolated based on the indication.

An exemplary apparatus in accordance with another embodiment of the present invention comprises a data packet pipeline and a monitoring element. The data packet pipeline is configured to transfer data between a buffer and a network socket. The monitoring element is configured to disable a first portion of the pipeline from processing a plurality of data packets flowing through the pipeline. The monitoring element is configured to monitor a second portion of the pipeline that is processing the plurality of data packets while the first portion is disabled, wherein the monitoring element is configured to determine whether disabling of the first portion by the monitoring element affects a data throughput of the second portion.

An exemplary apparatus in accordance with yet another embodiment of the present invention comprises a data packet pipeline and a monitoring element. The data packet pipeline is configured to transfer data between a buffer and a network socket. The monitoring element is configured to cause the data packet pipeline to discard a plurality of data packets flowing through the pipeline, and the monitoring element is further configured to determine a value indicative of an operational performance of the pipeline in processing the plurality of packets.

BRIEF DESCRIPTION OF THE DRAWINGS

The invention can be better understood with reference to the following drawings. The elements of the drawings are not necessarily to scale relative to each other, emphasis instead being placed upon clearly illustrating the principles of the invention. Furthermore, like reference numerals designate corresponding parts throughout the several views.

DETAILED DESCRIPTION

Figure 1:
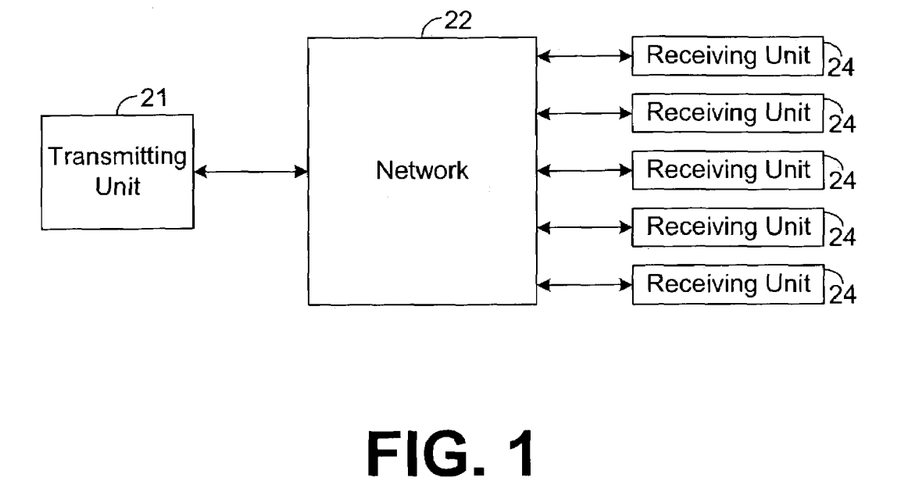
FIG. 1 is a block diagram illustrating an exemplary communication system in accordance with the present invention.

FIG. 1 depicts a communication system 20 in accordance with an exemplary embodiment of the present invention. As shown by FIG. 1, a transmitting apparatus or unit 21 transmits graphical data through a network 22 to at least one receiving apparatus or unit 24. For illustrative purposes, the transmitting unit 21 will be described hereafter as transmitting graphical data to a plurality of receiving units 24, which render the graphical data via known or future-developed techniques. However, it should be noted that the transmitting unit 21 may be configured, in other embodiments, to communicate other types of data, and the transmitting unit 21 may be configured to transmit such data with any number of receiving units 24.

Figure 2:
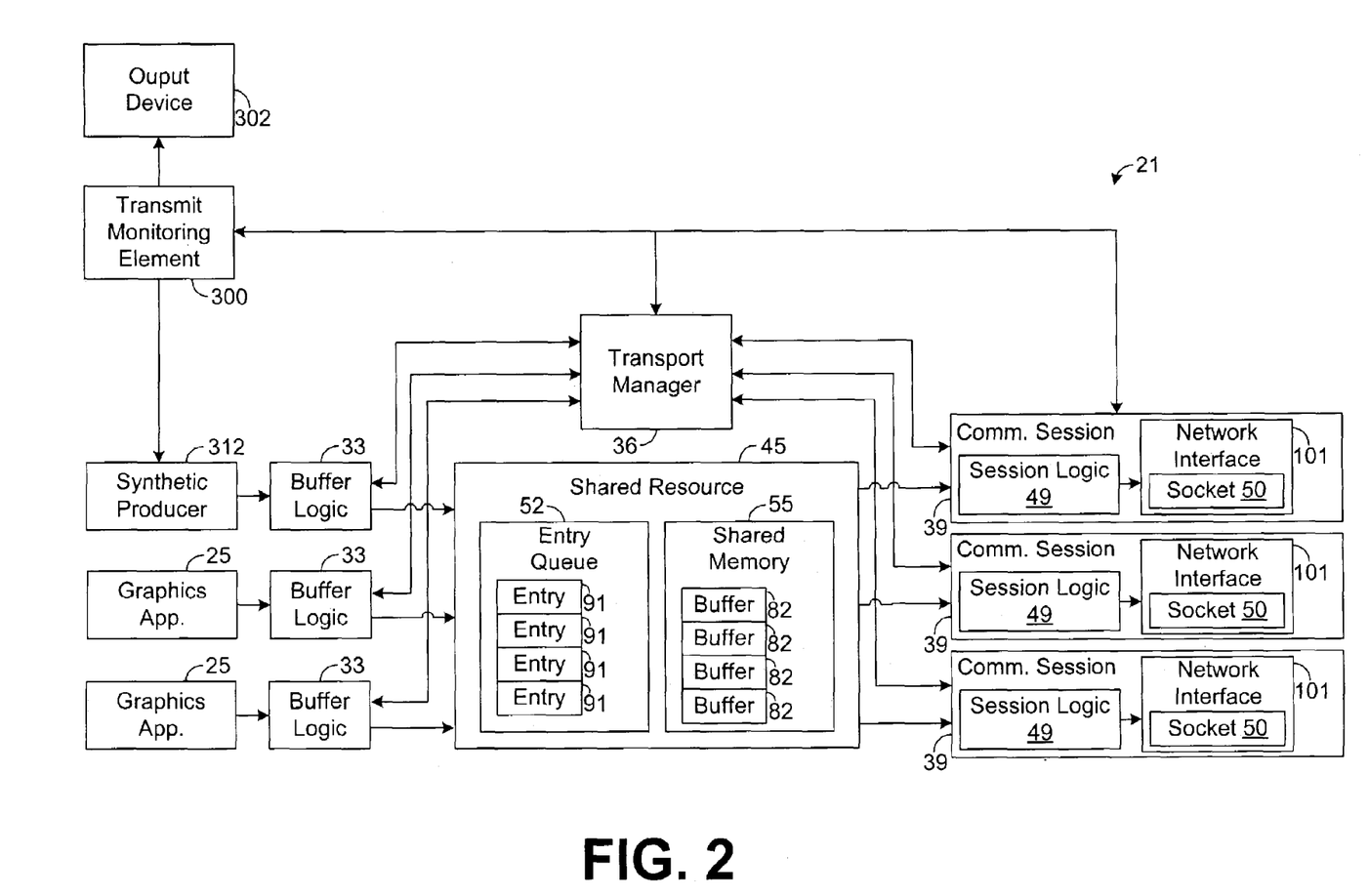
FIG. 2 is a block diagram illustrating an exemplary transmitting unit, such as is depicted in FIG. 1.

As shown by FIG. 2, the transmitting unit 21 preferably comprises at least one graphics application 25 that produces graphical data for transmission through the network 22. In the embodiment shown by FIG. 2, each graphics application 25 communicates with a corresponding set of buffer logic 33. When a graphics application 25 is invoked for communicating graphical data to at least one receiving unit 24, the graphics application 25 notifies its corresponding buffer logic 33, and this buffer logic 33 preferably submits a request, referred to hereafter as a "session request," to a transport manager 36. In response, the transport manager 36, as will be described in more detail hereinafter, associates the graphics application 25 with at least one of a plurality of processes 39, referred to herein as "communication sessions." As will be described in more detail below, each session 39 is responsible for interfacing, with the network 22, graphical data produced by its associated graphics applications 25.

In this regard, each graphics application 25 produces graphical data via known or future-developed techniques, and its corresponding buffer logic 33 stores the graphical data within a shared resource 45 that is accessible by each buffer logic 33, as well as each communication session 39 shown in FIG. 2. Session logic 49 within each communication session 39 searches the shared resource 45 for data that its communication session 39 is responsible for interfacing with the network 22. When the session logic 49 within a particular communication session 39 finds, in the shared resource 45, graphical data from a graphics application 25 associated with the particular communication session 39, the session logic 49 retrieves such graphical data from the shared resource 45. The particular communication session 39 writes the graphical data to a socket 50 of a network interface 101, which interfaces the retrieved graphical data with the network 22 such that the data is communicated to the appropriate receiving units 24.

Since communication of the graphical data with the network 22 is handled by associated communication sessions 39, a graphics application 25 and/or its corresponding set of buffer logic 33 may begin performing other tasks once the graphical data has been written to the shared resource 45. In this regard, it may be assumed, by the graphics application 25 and/or its corresponding set of buffer logic 33, that the graphical data will be successfully transmitted to the appropriate receiving units 24 once the graphical data has been stored in the shared resource 45. Thus, after the graphical data has, in fact, been stored in the shared resource 45, the graphics application 25 may begin to immediately process the next set of graphical data. As a result, delays introduced by the communication of graphical data through the network 22 preferably do not significantly impact the performance of the graphics application 25.

Furthermore, each communication session 39 preferably runs on a separate thread of execution as compared to the graphics application 25 and the other communication sessions 39. As a result, the consumption of processing resources by each communication session 39 preferably does not significantly reduce the processing speed of the graphics application 25 and to the other communication sessions 39. However, it should be noted that, in other embodiments, it is possible for multiple ones of the communication sessions 39 to be implemented on the same thread of execution as another communication session 39 or as a graphics application 25.

It should be further noted that there are various techniques and protocols that may be employed to buffer data in the shared resource 45. Exemplary techniques for achieving this functionality will now be described in more detail below.

When a graphics application 25 is ready to initiate communication with at least one receiving unit 24, this graphics application 25, referred to hereafter as the "transmitting application 25," notifies its corresponding set of buffer logic 33, referred to hereafter as the "transmitting buffer logic 33." In response to such notification, the transmitting buffer logic 33 is configured to submit a session request to the transport manager 36. This session request may identify (e.g., include the address of) each receiving unit 24 to which graphical data from the transmitting graphics application 25 is to be communicated, and the session request also may identify the type of transport protocol that is to be used to communicate such graphical data.

In a preferred embodiment, the network 22 is an internet protocol (IP) network, and the session request comprises the IP address of each receiving unit 24 that is to receive graphical data from the transmitting application 25. Further, the communication sessions 39 may be configured to enable various types of protocols for communication across the network 22. As an example, the communication sessions 39 may selectively enable communication via transmission control protocol (TCP), user datagram protocol (UDP), UDP-multicast (UDPM), and/or any other type of known or future-developed protocol.

In response to the session request, the transport manager 36 selects a set of communication sessions 39 to service the transmitting graphics application 25 (i.e., to handle the communication of the transmitting graphics application's data with the network 22). In this regard, the transport manager 36 preferably analyzes each active communication session 39 to determine whether any of the active sessions 39 are currently communicating data to the same set of receiving units 24 via the same protocol identified by the session request. Note that a communication session 39 is "active" when it is currently handling the communication of at least one graphics application 25, and a communication session 39 is "inactive" when it is not presently handling the communication of any of the graphics applications 25. Further note that while in an inactive state, a communication session 39 is preferably not running (e.g., is asleep) and, therefore, does not significantly consume processing resources.

Moreover, if the transport manager 36 identifies any communication sessions 39 that are communicating to the same set of receiving units 24 via the same protocol identified by the session request, the transport manager 36 may be configured to select such identified communication sessions 39, if any, to service the transmitting graphics application 25. Note that such communication sessions 39 may exist when another graphics application 25 has previously initiated communication, via the same protocol requested via the session request, with the same set of receiving units 24 identified by the session request.

If none or an insufficient number of the active communication sessions 39 are presently communicating with the same set of receiving units 24 and with the same transport protocol, then the transport manager 36 preferably also selects at least one of the inactive communication sessions 39 to service the graphics application 25. For each selected inactive session 39, the transport manager 36 activates (e.g., awakens) the selected session 39 and configures the session 39 to communicate, via the transport protocol identified by the session request, with the set of receiving units 24 also identified by the session request.

In this regard, the transport manager 36 preferably stores or maintains sufficient information for enabling the manager 36 to find and initiate communication with each of the receiving units 24. Moreover, when the transport manager 36 receives a session request from the transmitting buffer logic 33, the manager 36 establishes a network socket (not specifically shown in FIG. 2) configured to interface data with the network 22 via the transport protocol identified by the session request. Using this socket, the transport manager 36 establishes communication with each receiving unit identified by the session request. Once such communication is established, the transport manager 36 hands-off or, in other words, allocates the foregoing socket to at least one session 39 activated for servicing the requesting application 25. The activated session 39 may utilize such socket for communicating with the identified receiving units 24 according to techniques that will be described in more detail hereinbelow.

Note that the number of sessions 39 selected to service a particular application 25 may vary depending on various factors and/or the configuration of the system 20. For example, the graphics application 25 or the buffer logic 33 that initiated the session request may be configured to request that a particular number of sessions 39 be utilized for communicating the graphical data produced by the graphics application 25. The transport manager 36 may be configured to select such a number of sessions 39 for servicing the graphics application 25 to the extent that such a number of sessions 39 is available.

The transport manager 36 preferably assigns, to each set of communication sessions 39 configured to transmit to the same receiving units 24 via the same protocol, an identifier that uniquely identifies such sessions 39 from the other sessions 39 that also may retrieve data from the shared resource 45. The transport manager 36, after selecting a set of the communication sessions 39 for servicing the transmitting graphics application 25, as described above, provides the session identifier of the selected set to the transmitting buffer logic 33. As will be described in more detail hereinbelow, the transmitting buffer logic 33 uses this session identifier when storing, to the shared resource 45, graphical data that is to be communicated to the receiving units 24.

Figure 3:
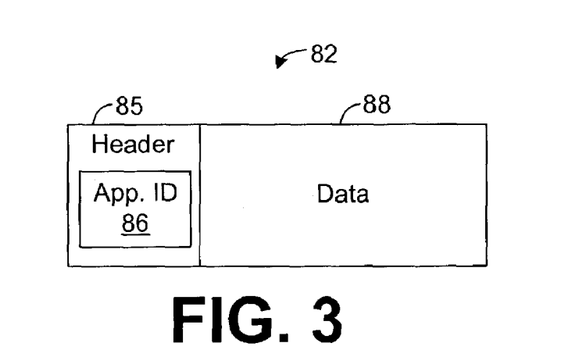
FIG. 3 is a block diagram illustrating an exemplary buffer within a shared resource, such as is depicted in FIG. 2.

As shown by FIG. 2, the shared resource 45 preferably comprises an entry queue 52 and shared memory 55 accessible by each of the sets of buffer logic 33 and the communication sessions 39. The shared memory 55 is preferably partitioned into multiple segments or blocks 82, referred to as "buffers." As shown by FIG. 3, each buffer 82 comprises a header 85, where various control information may be stored, and a data portion 88, where data (e.g., graphical data from one of the graphics applications 25) to be communicated over the network 22 may be stored. Techniques for storing and retrieving data to and from the buffers 82 will be described in more detail hereinbelow.

Figure 4:
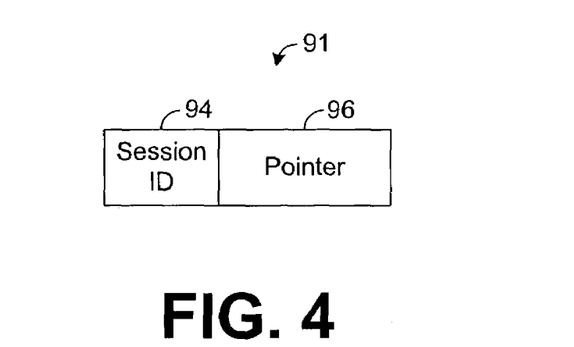
FIG. 4 is a block diagram illustrating an exemplary entry in an entry queue of a shared resource, such as is depicted in FIG. 2.

The entry queue 52 of FIG. 2 preferably stores a plurality of queued entries 91, and each entry 91 has a session identifier (ID) 94 and a pointer 96, as shown by FIG. 4. Initially, the number of entries 91 corresponds to the number of buffers 82. More specifically, in the exemplary embodiment shown by FIG. 2, there is initially one entry 91 for each buffer 82. Further, each entry 91 preferably corresponds to a different buffer 82, and the pointer 96 of an entry 91 corresponding to a particular buffer 82 preferably points to (i.e., identifies) the particular buffer 82. Thus, initially, each entry 91 corresponds to and points to a different buffer 82.

Initially, the session identifier 94 of each entry 91 comprises a value, referred to hereafter as an "empty buffer value," which indicates that the buffer 82 identified by the entry's pointer 96 is empty (i.e., may be written to without corrupting or losing data). Note that once operation of the system 20 is begun, new entries 91 having other values stored as the session identifier 94 are preferably pushed into the queue 52 as will be described in more detail hereafter. Thus, after operation of the system 20 is initiated, some of the entries 91 may have the empty buffer value stored as their session identifiers 94, and some of the entries 91 may other values stored as their session identifiers 94.

Moreover, when the transmitting application 25 is ready to transmit a set of graphical data to a set of receiving units 24, its corresponding set of buffer logic 33 (i.e., the transmitting buffer logic 33) searches the queue 52 for an entry 91 having the empty buffer value stored as the entry's session identifier 94. Such an entry 91 is referred to herein as an "empty buffer entry 91." When the transmitting buffer logic 33 locates such an empty buffer entry 91, it pulls the entry 91 from the queue 52 or, in other words, "pops" the entry 91 such that the entry 91 is no longer stored in the queue 52, thereby disabling other components of the transmitting unit 21 from accessing the popped entry 91. The transmitting buffer logic 33 writes the aforementioned set of graphical data to the buffer 82 pointed to or, in other words, identified by the pointer 96 of the popped entry 91. For illustrative purposes, the foregoing buffer 82 will be referred to hereafter as the "used buffer 82."

After popping, from the queue 52, an empty buffer entry 91 identifying the used buffer 82 and then writing to the used buffer 82, the transmitting buffer logic 33 pushes, into the queue 52, an entry 91 having the same pointer 96 as the popped entry 91 (i.e., having a pointer 96 identifying the used buffer 82). However, the transmitting buffer logic 33 assigns the session identifier 94 of the pushed entry 91 the value of the session identifier previously provided to it by the transport manager 36. In other words, the session identifier 94 of the pushed entry 91 is associated with or identifies the set of communication sessions 39 that have been selected, by the transport manager 36, to service the transmitting application 25.

Note that, in one exemplary embodiment, each set of buffer logic 33 is configured to write data to a buffer 82 only when the set of buffer logic 33 is able to locate, in the queue 52, an empty buffer entry 91 that points to the particular buffer 82, as described above. Thus, by popping, from the queue 52, an empty buffer entry 91 identifying the used buffer 82, the transmitting buffer logic 33 temporarily prevents or disables other sets of buffer logic 33 from writing to the used buffer 82, thereby preventing corruption of the graphical data written to the used buffer 82 by the transmitting buffer logic 33.

After writing graphical data to the buffer 82, buffer logic 33 also stores, in the header 85, a value uniquely identifying the graphics application 25 that produced the data written to the buffer 55. This value will be referred to herein as the "application identifier 86." Thus, by analyzing the application identifier 86 in the header 85 of a buffer 82, it is possible to determine which application 25 produced the data that is stored in the data portion 88 of the buffer 82. Utilization of the application identifier 86 will be described in more detail hereafter. Note that the application identifier 86 of each application 25 may be predefined and provided by the graphics applications 25, or the transport manager 36 may be configured to assign a unique application identifier to each application 25 that initiates a session request transmitted to the transport manager 36.

The session logic 49 of each active communication session 39 preferably searches the queue 52 for any entries 91 that have session identifiers 94 identifying its communication session 39. When such an entry 91 is found, the session logic 49 pulls the entry 91 from the queue 52 or, in other words, "pops" the entry 91 such that the entry 91 is no longer stored in the queue 52 thereby disabling other components of the transmitting unit 21 from accessing the popped entry 91. The session logic 49 also retrieves the graphical data stored in the buffer 82 identified by the popped entry's pointer 96 (FIG. 4) and provides the retrieved data to a network interface 101, which transmits the retrieved data to the network 22 (FIG. 1). As described above, when a session 39 is activated, it is instructed by the transport manager 36 to communicate, via a certain protocol, over the network 22 to a set of identified receiving units 24. Moreover, when the session 39 pops an entry 91 from the queue 52 and retrieves the graphical data stored at the buffer 82 identified by the popped entry 91, the session 39 transmits, according to the certain protocol, the retrieved data over the network 22 to the identified receiving units 24.

It should be noted, that when the transport manager 36 selects more than one session 39 to service the transmitting graphics application 25, there are a plurality of sessions 39 searching the queue 52 for entries 91 that point to buffers 82 storing graphical data from the transmitting application 25. In particular, each of the sessions 39 selected, by the transport manager 36, to service the transmitting application 25 searches the queue 52 for entries 91 having the session identifier 94 associated with the selected set of sessions 39. However, since each session 39 pops an entry 91 from the queue 52 when it locates an entry 91 having the associated session identifier 94, the other selected sessions 39 that are searching for the same session identifier 94 are prevented or disabled from finding the popped entry 91. Thus, only the session 39 that pops the entry 91 from the queue 52 accesses and transmits, across the network 22, the data stored in-the buffer 82 pointed to by the popped entry 91. Therefore, multiple transmissions of the same graphical data by multiple sessions 39 is prevented even though multiple sessions 39 may be allocated for servicing the same application 25 and, therefore, assigned the same session identifier. Such a feature helps to reduce needless additional transmissions of the same graphical data thereby helping to enhance the efficiency of the system 20.

Figure 5:
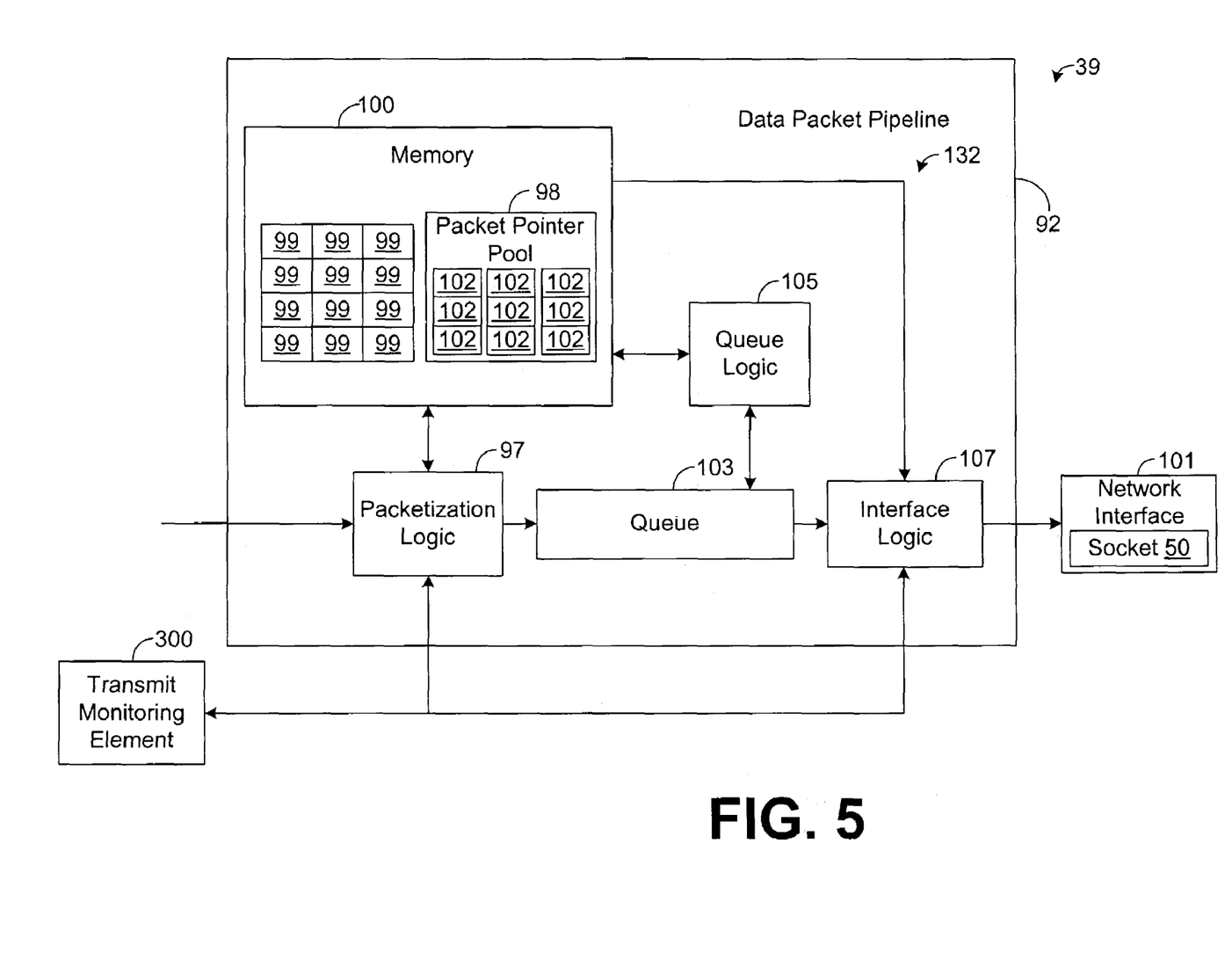
FIG. 5 is a block diagram illustrating an exemplary communication session, such as is depicted in FIG. 2.

FIG. 5 depicts a communication session 39 in accordance with an exemplary embodiment of the present invention. As shown by FIG. 5, the session 39 comprises a data packet pipeline 92 for transferring data from the buffers 82 (FIG. 2) to the network socket 50. Packetization logic 97 within the pipeline 92 is configured to retrieve and packetize data from the buffers (FIG. 2). In this regard, a packet pointer pool 98 and a plurality of pre-allocated memory blocks 99 preferably reside within memory 100. The packet pointer pool 98 preferably has a plurality of pointer entries 102 that respectively point to the memory blocks 99. In this regard, each pointer entry 102 in the packet pointer pool 98 preferably points to an available one of the memory blocks 99 (i.e., one of the memory blocks 99 that may be written to without corrupting data within the memory block 99). Initially, all of the memory blocks 99 are available, and the packet pointer pool 98 comprises a pointer entry 102 for each of the memory blocks 99. However, when a memory block 99 is written to, as will be described in more detail hereinbelow, the pointer entry 102 associated with (i.e., pointing to) this memory block 99 is pulled from the pool 98 and is not returned until the memory block 99 is again available. Thus, the entries 102 of the packet pointer pool 98 may be analyzed to determine which of the memory blocks 99 may be written to.

Note that it is not necessary for the blocks 99 to be pre-allocated. In this regard, it is possible for the packetization logic 97 to dynamically allocate a memory block 99 and an associated pointer entry 98 for each packet generated by the packetization logic 97. However, the allocation of memory blocks 99 and packet pointer entries 102 consumes time and processing resources potentially slowing the rate at which the packetization logic 97 can process data packets. Thus, pre-allocating memory blocks 99 and-pointer entries 102 helps to improve the performance of the packetization logic 97 by eliminating the step of dynamically allocating memory for the data packetized by the packetization logic 97.

For each packet packetized by the logic 97, the logic 97 pulls a pointer entry 102 from the packet pointer pool 98 and stores the packetized packet into the memory block 99 pointed to by the pulled entry 102. The packetization logic 97 also inserts the pulled entry 102 into a queue 103. Thus, the queue 103 may store several entries 102 pointing to memory blocks 99 storing packetized data. Queue logic 105 preferably retains each entry 102 in the queue 103 until it can be ensured that a retransmission request, from the receiving units 24, for retransmitting the packet stored at the corresponding block 99 will not be received. Once it can be ensured that such a retransmission request will not be received, the queue logic 105 preferably stores the entry 102 into the packet pointer pool 98. Returning an entry 102 to the packet-pointer pool 98, as described above, has the effect of freeing the memory block 99 pointed to by the returned entry 102. In this regard, once an entry 102 is returned to the pointer pool 98, the entry 102 may be pulled by the packetization logic 97, and the corresponding memory block 99 may be used by the logic 97 to store a data packet that is packetized by the logic 97.

Interface logic 107 periodically reads entries 102 from the queue 103. For each entry 102 read from the queue 103, the interface logic 107 retrieves the packet stored at the memory block 99 pointed to by the entry 102. The interface logic 107 passes the retrieved data to network interface 101 (FIG. 2), which communicates the data via the network 22 (FIG. 1) to at least one receiving unit 24. In a preferred embodiment, the interface logic 107, with certain possible exceptions, such as the servicing of a retransmission request, for example, generally pulls entries 102 from the queue 103 in the same order that such entries 102 are inserted into the queue 103 by the packetization logic 97. Thus, data packets are generally transmitted to the network 22 and the receiving units 24 generally in the same order that the packets are generated by the packetization logic 97.

Figure 6:
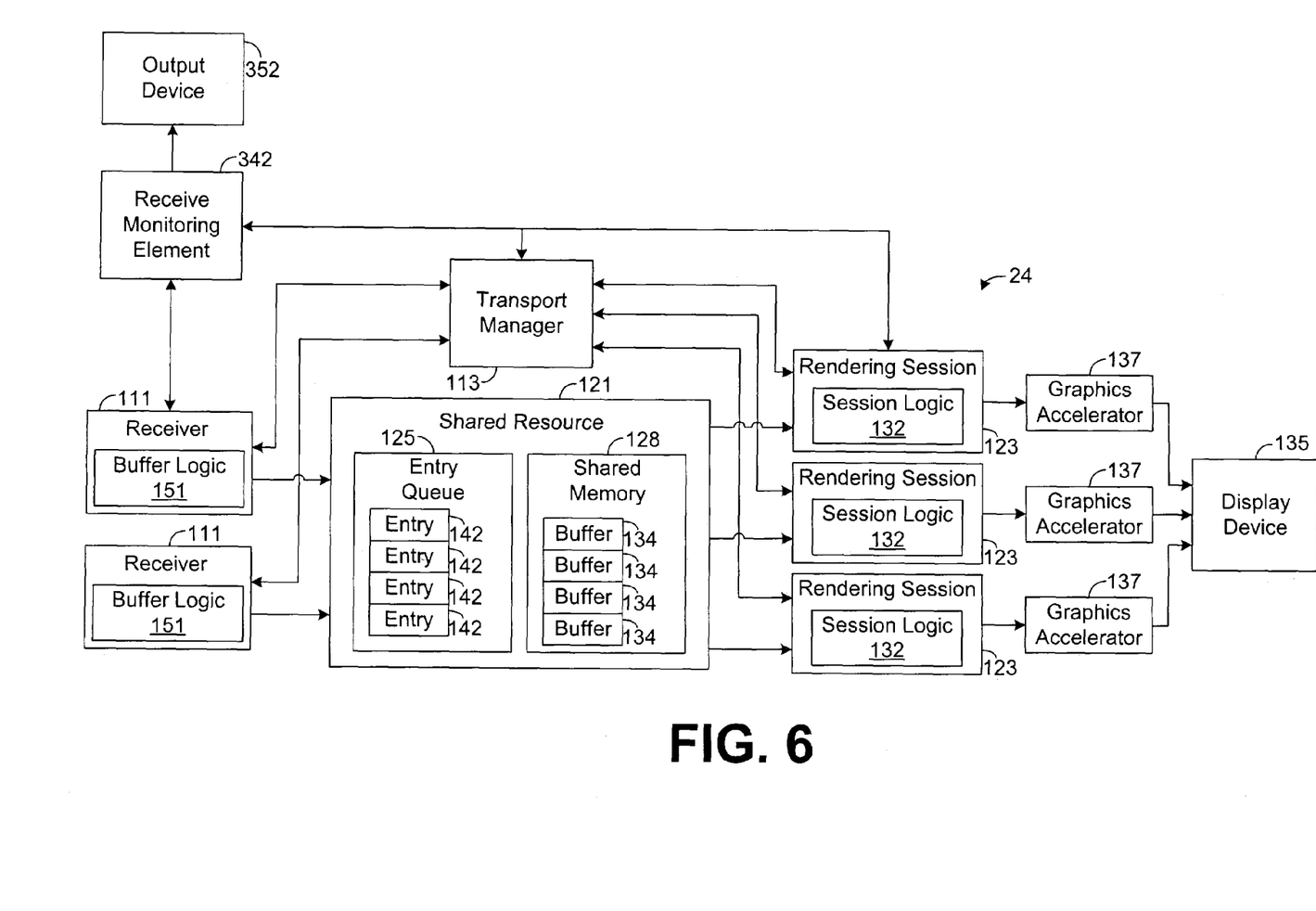
FIG. 6 is a block diagram illustrating an exemplary receiving unit, such as is depicted in FIG. 1.

At each receiving unit 24, similar techniques for buffering the graphical data received from the network 22 may be employed. In this regard, as shown by FIG. 6, each receiving unit 24 preferably comprises, at least one receiver 111, a transport manager 113, a shared resource 121, and at least one rendering session 123. The shared resource 121 is preferably accessible by each receiver 111 and each rendering session 123. Further, similar to the shared resource 45 described above, the shared resource 121 at the receiving unit 24 preferably comprises an entry queue 125 and shared memory 128, and the shared memory 128 is preferably partitioned into multiple buffers 134.

Figure 7:
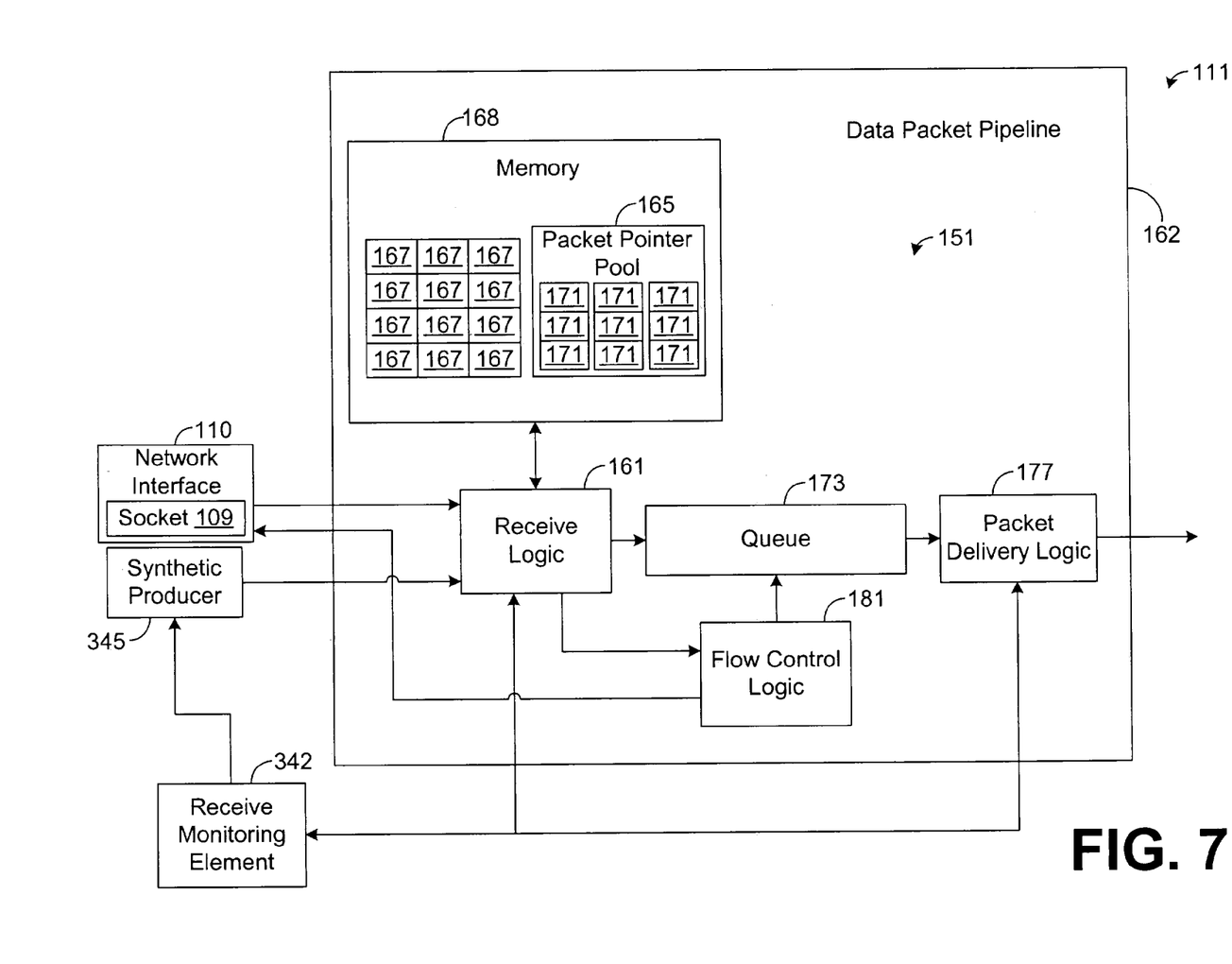
FIG. 7 is a block diagram illustrating an exemplary receiver, such as is depicted in FIG. 6.

FIG. 7 depicts a receiver 111 in accordance with an exemplary embodiment of the present invention. As shown by FIG. 7, the receiver 111 comprises a data packet pipeline 162 for transferring data packets from the network socket 50 to the buffers 134 (FIG. 6). Receive logic 161 within the pipeline 162 is configured to receive data packets from a network interface 110. In this regard, a packet pointer pool 165 and a plurality of pre-allocated memory blocks 167 preferably reside within memory 168. The packet pointer pool 165 preferably has a plurality of pointer entries 171 that respectively point to the memory blocks 167. In this regard, each pointer entry 171 in the packet pointer pool 65 preferably points to an available one of the memory blocks 167 (i.e., one of the memory blocks 167 that may be written to without corrupting data within the memory block 167). Initially, all of the memory blocks 167 are available, and the packet pointer pool 165 comprises a pointer entry 171 for each of the memory blocks 167. However, when a memory block 167 is written to, as will be described in more detail hereinbelow, the pointer entry 171 associated with (i.e., pointing to) this memory block 167 is pulled from the pool 165 and is not returned until the memory block 167 is again available. Thus, the entries 171 of the packet pointer pool 165 may be analyzed to determine which of the memory blocks 167 may be written to.

Note that it is not necessary for the blocks 167 to be pre-allocated. In this regard, it is possible for the receive logic 161 to dynamically allocate a memory block 167 and an associated pointer entry 171 for each packet generated by the receive logic 161. However, the allocation of memory blocks 167 and packet pointer entries 171 consumes time and processing resources potentially slowing the rate at which the receive logic 161 can process data packets. Thus, pre-allocating memory blocks 167 and pointer entries 171 helps to improve the performance of the receive logic 161 by eliminating the step of dynamically allocating memory for the data packets received by the receive logic 161.

For each packet received by the logic 161, the logic 161 pulls a pointer entry 171 from the packet pointer pool 165 and inserts the data packet into the memory block 167 pointed to by the pulled entry 171. The receive logic 161 inserts the pulled entry 171 into an ordered queue 173. Thus, the queue 173 may store several entries 171, pointing to memory blocks 167 storing packetized data.

Packet delivery logic 177 periodically pulls an entry 171 from the queue 173. For each entry 171 pulled from the queue 173, the packet delivery logic 177 retrieves the data stored at the memory block 167 pointed to by the pulled entry 171. The packet delivery logic 177 then writes the retrieved data to the shared resource, according to techniques that will be described in more detail hereinbelow. The packet delivery logic 177 also returns the pulled entry 171 to the packet pointer pool 168. Note that returning an entry 171 to the packet pointer pool 168 has the effect of freeing the memory block 167 pointed to by the returned entry 171. In this regard, once an entry 171 is returned to the pointer pool 168, the entry 171 may be pulled by the receive logic 161, and the corresponding memory block 167 may be used by the logic 161 to store a data packet received by the logic 161.

Note that the queue 173 is preferably ordered such that packets are retrieved by the packet delivery logic 177 and written to the shared resource 121 is the same order that such packets are originally transmitted from the transmitting unit 21 (FIG. 1). In this regard, the queue 173 is preferably ordered such that each entry 171 pulled from the queue 173 by the packet delivery logic 177 points to a successively transmitted packet relative to the previous packet written to the shared resource 121. Exemplary techniques for achieving the foregoing are described in more detail in co-pending and commonly-assigned U.S. patent application entitled "Apparatus and Method for Receiving Data from a Network," and filed on Feb. 8, 2003, which is incorporated herein by reference.

Further, flow control logic 181 preferably monitors the packets received by the receive logic 161 and determines whether any packets are missing from a received sequence of packets. If so, the flow control logic 181 transmits a retransmission request to the transmitting unit 21 requesting retransmission of the missing data packets. In response, the transmitting unit 21 retransmits the requested packets, and these packets may be received in a similar manner as the received packets described above. In this regard, for each such packet, an entry 171 may be pulled from the pool 165, and the packet may be written to the memory block 167 identified by this entry 171, which is inserted into the queue 173 and processed according to the aforedescribed techniques.

Figure 8:
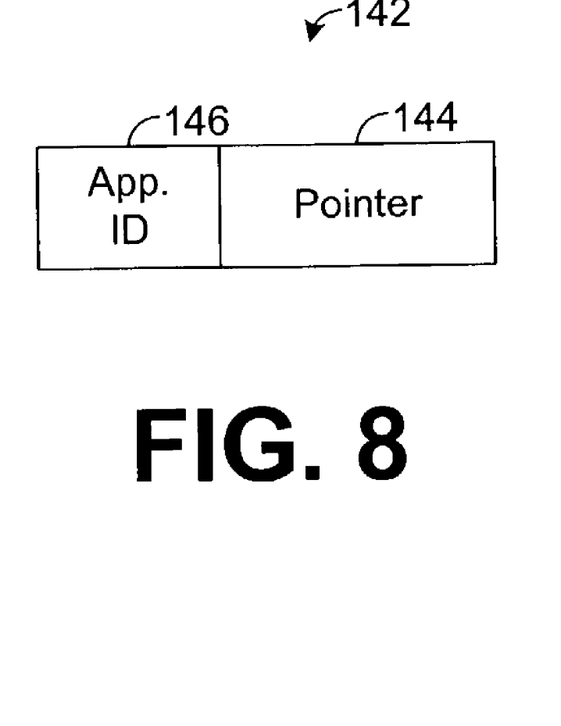
FIG. 8 is a block diagram illustrating an exemplary entry in an entry queue of a shared resource, such as is depicted in FIG. 6.

As shown by FIG. 6, the entry queue 125 preferably stores a plurality of queued entries 142, and each entry 142, as shown by FIG. 8, has a pointer 144 and an application identifier (ID) 146, which is received from the network 22. Like the pointers 96 of the queue entries 91 of FIG. 4 that identify buffers 82 (FIG. 2) in shared memory 55, the pointers 144 of the queue entries 142 point to or, in other words, identify buffers 134 in the shared memory 128. Initially, the number of entries 142 corresponds to the number of buffers 134. More specifically, there is initially one entry 142 for each buffer 134. Further, each entry 142 preferably corresponds to a different buffer 134, and the pointer 144 of the entry 142 corresponding to a particular buffer 134 preferably points to (i.e., identifies) the particular buffer 134. Thus, initially, each entry 142 corresponds to and points to a different buffer 134.

Like the session identifiers 94 of the entries 91 in FIG. 2, the application identifier 146 of each entry 142 initially comprises an empty buffer value indicating that the buffer 134 identified by the entry's pointer 144 is empty (i.e., may be written to without corrupting or losing data). Note that once operation of the system 20 is begun, new entries 142 having other values stored as the application identifier 146 are preferably pushed into the queue 125, as will be described in more detail hereafter. Thus, after operation of the system 20 is initiated, some of the entries 142 may have the empty buffer value stored as their application identifiers 146, and some of the entries 142 may other values stored as their application identifiers 146.

Moreover, when a receiver 111 receives graphical data from the network 111, buffer logic 151 within the receiver 111 searches the queue 125 for an entry 142 having the empty buffer value stored as the entry's application identifier 146. Such an entry 142 is referred to as an "empty buffer entry 142." When the foregoing logic 151, referred to hereafter as the "receiving buffer logic 151," locates such an empty buffer entry 142, the receiving buffer logic 151 pulls the empty buffer entry 142 from the queue 125 or, in other words, "pops" the entry 142 such that the empty buffer entry 142 is no longer stored in the queue 125. The receiving buffer logic 151, then writes the received graphical data to the buffer 134 pointed to or, in other words, identified by the pointer 144 of the popped entry 142. For illustrative purposes, the foregoing buffer 134 will be referred to hereafter as the "used buffer 134."

Figure 9:
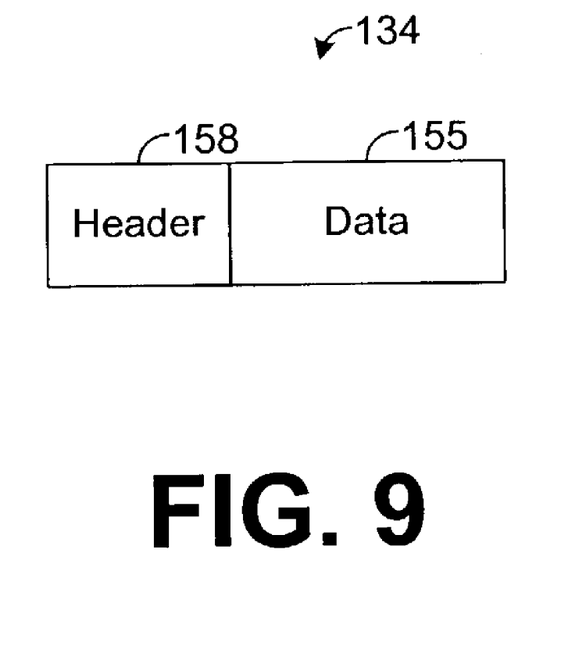
FIG. 9 is a block diagram illustrating an exemplary buffer within a shared resource, such as is depicted in FIG. 6.

As shown by FIG. 9, each buffer 134 comprises data portion 155 and a header 158. In general, graphical data is stored in the data portion 155, and various control information is stored in the header 158. As an example, the buffer logic 151 may write, into the header 158, the application identifier 146 identifying the application 25 that produced the data presently stored in the data portion 155.

After popping, from the queue 125, the empty buffer entry 142 identifying the used buffer 134, the receiving buffer logic 151 pushes, into the queue 125, at least one entry 142 having the same pointer 144 as the popped entry 142 (i.e., having a pointer 144 identifying the used buffer 134).

However, the receiving receiver 111 assigns the application identifier 146 of the pushed entry 142 the value of the application identifier transmitted along with the graphical data over the network 142. Thus, the application identifier 146 of the pushed entry 142 identifies the graphics application 25 that originally produced the graphical data being stored in the used buffer 134 by the receiving buffer logic 151.

Note that each receiver 111 is preferably configured to write data to a particular buffer 134 only when the receiver 111 is able to locate an empty buffer entry 142 in the queue 125 that points to the particular buffer 134. Thus, by popping, from the queue 125, an empty buffer entry 134 identifying a buffer 134, a receiver 111 temporarily prevents or disables other receivers 111 from writing to the buffer 134, thereby preventing corruption of the graphical data written to the buffer 134.

Like the transport manager 36 of FIG. 2, the transport manager 113 of the receiving unit 24 depicted by FIG. 6 preferably allocates at least one rendering session 123 for rendering the graphical data from a particular application 25. This may be achieved by providing the application's identifier to each rendering session 123 that is to render the application's graphical data. Session logic 132 of each such rendering session 123 then searches the entry queue 125 for entries 142 having the application identifier 146 provided to the session 123 much in the same manner that each rendering session 92 of FIG. 2 searches the queue 52 for entries 91 having the session identifier 94 provided to the session 92 by the transport manager 36. When the session logic 132 finds such an entry 142, the session logic 132 pops the entry 142 from the queue 125 and retrieves the graphical data stored in the buffer 134 pointed to by the popped entry 142. The session logic 132 then renders the retrieved data to at least one display device 135 via a graphics accelerator 137. Note that the application identifier of each application 25, if not already known by the transport manager 113, may be transmitted to the transport manager 113 by the transport manager 36 of FIG. 2 or some other component of the transmitting unit 21.

Note that exemplary techniques that may be used by the system 20 to communicate and buffer data are described in more detail in co-pending and commonly-assigned U.S. patent application entitled "Apparatus and Method for Communicating with a Network," and filed on Feb. 8, 2003, which is incorporated herein by reference. Additional techniques are also described in co-pending and commonly-assigned U.S. patent application entitled "Apparatus and Method for Transmitting Data through a Network," and filed on Feb. 8, 2003, which is incorporated herein by reference Monitoring of the communication system 20 may be desirable for a variety of reasons, such as enabling debugging and/or tuning of the communication occurring across the system 20. Thus, as shown by FIG. 2, the transmitting unit 21 preferably comprises a transmit monitoring element 300 for monitoring and/or improving the performance of the transmitting unit 21. The monitoring element 300 preferably communicates with various components of the unit 21 requesting that such components provide the monitoring element 300 with data indicative of the components' performance. By analyzing such data, the monitoring element 300 may identify and isolate various problems occurring within the unit 21. Depending on the type of problem encountered, the monitoring element 300 may attempt to adjust the configuration of the unit 21 in an effort to correct the problem, and the monitoring element 300 may output a message to a user in order to notify the user of a detected problem. Further, the monitoring element 300 may also output a report indicative of the performance of various components of the transmitting unit 21, and a user may utilize such report to debug or improve the configuration or design of the unit 21.

Note that when outputting a message or report, as described above, the monitoring element 300 may render or otherwise transmit data defining such message or report to an output device 302, such as a display device or printer. The output device 302 may then display to a user the message or report defined by such data.

To better illustrate monitoring techniques that may be performed by the transmit monitoring element 300, refer to FIG. 5. As shown by FIG. 5, the monitoring element 300 is preferably coupled to the packetization logic 97 and the interface logic 107. The monitoring element 300 may be configured to transmit, to the packetization logic 97, a message requesting that the logic 97 return a value indicative of the rate that the packetization logic 97 inserts entries 102 into the queue 103. In response, the packetization logic 97 counts the number of entries 102 input to the queue 103 during a particular time period and calculates a rate of entry insertion into the queue 103 based on the count. The packetization logic 97 transmits, to the monitoring element 300, a value indicative of the calculated rate.

Further, the monitoring element 300 may also be configured to transmit, to the interface logic 107, a message requesting that the logic 107 return a value indicative of the rate that the interface logic 177 pulls entries 102 from the queue 103. In response, the interface logic 177 counts the number of entries 102 that it pulls from the queue 103 during a particular time period and calculates a rate that entries 102 are pulled from the queue 103. The interface logic 107 transmits, to the monitoring element 300, a value indicative of the calculated rate.

Moreover, based on the aforementioned values provided by the packetization logic 97 and the interface logic 107, the monitoring element 300 may detect a possible problem with the operation of the transmitting unit 21. For example, the monitoring element 300 may determine that the interface logic 107 is pulling entries 107 at a much slower rate than the packetization logic 97 inserts entries 102. In such an example, the monitoring element 300 may be configured to slow the rate at which the packetization logic 97 inserts entries 102 into the queue 103 in order to prevent a possible data overrun in the queue 103. Also, the monitoring element 300 may output a message indicative of the respective performances the packetization logic 97 and interface logic 107, and a user may utilize the information gleaned by this message to debug or redesign the unit 21.

Further, the monitoring element 300 may also utilize the information provided by the packetization logic 97 and interface logic 107 to automatically debug an operational problem associated with the transmitting unit 21. As an example, based on the aforementioned rates provided by the packetization logic 97 and the interface logic 107, the monitoring element 300 may determine that an operational problem exists downstream of the queue 103 (e.g., between the interface logic 107 and the network 22 (FIG. 1)). Thus, in such an example, the monitoring element 300 is configured to perform additional monitoring with respect to components downstream of the queue 107 in an effort to isolate and diagnose the operational problem.

Note that, in some circumstances, more precise performance information may be desired in order to better debug or tune the transmitting unit 21. In this regard, a problem in one component of the transmitting unit 21 may ripple through the unit 21 and cause poor performance for many of the unit's other components. As an example, a problem with interfacing data packets with the network 22 may cause a data bottleneck at the network interface 101 resulting in poor performance for many of the network components. In this regard, such a problem may reduce that rate at which the interface logic 107 pulls entries 102 from the queue 103 thereby reducing the rate at which the packetization logic 97 inserts entries 102 into the queue 103. In such a situation, it may be difficult to determine whether a network interface problem is causing poor performance of the packetization logic 97 or whether a problem with the packetization logic 97 is causing poor performance of the network interface 101.

Further, when a single monitored component performs multiple tasks, it may be difficult to determine which task is causing poor performance by the component. For example, if it is determined that interface logic 107 is pulling entries from the queue 103 at a slow rate, then the source of the problem may not be readily apparent. More specifically, it may not be clear as to whether the interface logic's task of retrieving data packets is causing poor performance or whether the interface logic's task of writing to the socket 50 is causing poor performance.

To provide better operational performance information in an attempt to address the aforedescribed monitoring issues, the monitoring element 300 may request that a component being monitored perform a limited number of tasks as compared to what the component would otherwise perform during normal operation. For example, the monitoring element 300 may disable a portion of the logic 107 that writes packets to the socket 50 of network interface 101. In response to such a request, the interface logic 107 may operate as described above except that the interface logic 107, rather than writing retrieved data packets to the socket 50, discards such data packets. Accordingly, any operational problems associated with the network interface 101, do not significantly affect the upstream components (e.g., packetization logic 97, queue 103, etc.). Thus, the process of diagnosing or isolating operational problems is simplified.

In this regard, if the operational performance of the packetization logic 97 (e.g., the rate at which the logic 97 inserts entries 102 into the queue 103) does not improve after disabling the interface logic 107 from writing to the socket 50, then the monitoring element 300 may determine that an operational problem affecting the performance of the packetization logic 97 is upstream of the network interface (e.g., is between the graphics application 25 and the network interface 101). However, if the performance of the packetization logic 97 is improved after disabling the interface logic 107 from writing to the network socket 50, then the monitoring element 300 may determine that an operational problem is downstream of the interface logic 107 (e.g., between the interface logic 108 and the network 22).

However, by limiting or disabling the performance of one or more components of the transmitting unit 21, data may be lost. For example, in the example described above where the interface logic 107 refrains from writing data packets to the socket 50, the data packets are discarded or, in other words, lost. Moreover, losing data produced by an application 25 running on the system 20 may have undesirable consequences. Thus, in an effort to limit the effects of the testing performed by the monitoring element 300, the monitoring element 300 is preferably configured to create or otherwise provide a synthetic application or producer 312 (FIG. 2). The synthetic producer 312 preferably produces data that may be discarded without adversely affecting another component of the system 20. In this regard, the data produced by the synthetic producer 312 may be arbitrary or meaningless in that the data is not to be utilized in the operation of the receiving units 24.

Moreover, the synthetic producer 312 preferably operates in a similar manner as the applications 25 except that the data produced by the synthetic producer 312 is discarded. In this regard, the synthetic producer 312, via the same techniques utilized by the graphics applications 25, may initiate a session request, which is transmitted to the transport manager 36 by the synthetic application's corresponding buffer logic 33. The transport manager 36 may be configured to handle the session request in the same manner described above for handling the session requests initiated by the graphics applications 25. Thus, the transport manager 36 allocates at least one communication session 39 to the synthetic producer 312 and returns the session identifier of the allocated session 39.

Using the returned session identifier, the corresponding buffer logic 33 may process the data produced by the synthetic producer 312 according to the techniques described above such that the allocated session 39 retrieves and processes such data. However, the monitoring element 300 is preferably configured to communicate with the allocated session 39 and request that the allocated session 39 provide performance data to the monitoring element 300.

Figure 10:
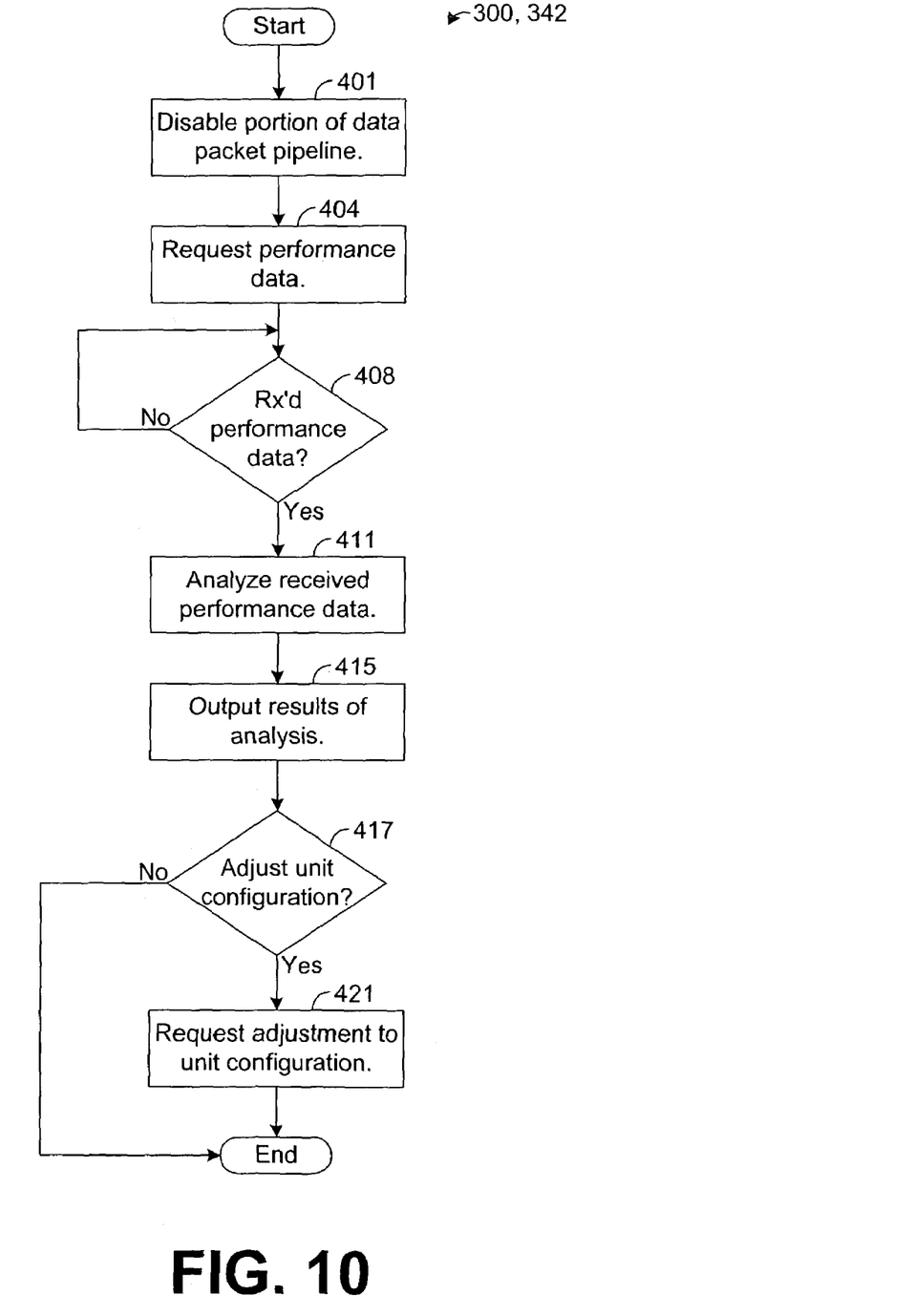
FIG. 10 is a flow chart illustrating an exemplary architecture and functionality of a monitoring element, such as is depicted in FIGS. 2 and 6.

Continuing with the example described above, the monitoring element 300 may request the interface logic 107 of the allocated session 39 to discard any data retrieved by it and to provide the monitoring element 300 with a value indicative of the number of data packets retrieved and/or discarded during a particular time period, as shown by blocks 401 and 404 of FIG. 10. Further, the monitoring element 300 may request performance data from other components of the transmitting unit 21 as well. Thus, the monitoring element 300 may collect, from the components of the transmitting unit 21, various performance information that is substantially free of various effects associated with the writing of data packets to the socket 50.

As shown by decision block 408 and block 411, the monitoring element 300 analyzes the aforementioned performance data when it is received by the monitoring element 300. The monitoring element 300 then outputs, via output device 302 (FIG. 2), the results of the analysis, as shown by block 415. If the monitoring element 300 determines, based on the analysis, that performance of the transmitting unit 21 may be improved by adjusting the configuration of the transmitting unit 21, then the transmit monitoring element 300 requests the appropriate adjustment to improve the unit's performance, as shown by decision block 417 and block 421.

As an example, the monitoring element 300 may initially determine a data throughput of the interface logic 107 (FIG. 5). In this regard, the monitoring element 300 determines, based on performance data provided by the interface logic 107, a value indicative of a number of data packets retrieved from the buffers 99 and provided to the network interface 101 during a particular time period. Note that such a value is indicative of the throughput rate of the interface logic 107. Then, in block 401, the monitoring element 300 requests the interface logic 107 to discard the retrieved data packets rather than interfacing such packets with the network interface 101. In other words, the monitoring element 300 disables the portion of the logic 107 that transmits data packets to the network interface 101, thereby disabling the network interface 101 from handling the data packets retrieved by the interface logic 107.

The monitoring element 300 may also request, in block 404, performance data indicative of the data throughput of the interface logic 107 when the transmitting portion of the interface logic 107 is disabled. In this regard, the transmit monitoring element 300 requests that the interface logic 107 provide a value indicative of the number of data packets retrieved and discarded by the interface logic 107 during a particular time period or, in other words, indicative of the throughput rate of the logic 107. The monitoring element 300 may then compare the aforementioned throughput rate values to determine whether disabling of the transmitting portion of the interface logic 107 significantly affected the data throughput of the logic 107. A significant change in the throughput rate may indicate that there is an operational problem or inefficiency associated with writing data packets to the socket 50. Thus, the monitoring element 300, in blocks 415 and 421, may respectively output data indicative of the detected operational problem or inefficiency and may adjust the configuration of the transmitting unit 21 in an attempt to compensate for the problem or inefficiency.

For example, the monitoring element 300 may adjust the packet lengths of the data packets produced by the packetization logic 97 by submitting an appropriate request to the logic 97. The monitoring element 300 may repeat the aforedescribed process of determining and comparing values indicative of the data throughput of the interface logic 107 to determine whether the adjustment improved the operation of the transmitting unit 21 and, more particularly, whether the adjustment compensated for or alleviated the detected problem or inefficiency. If the adjustment did not sufficiently improve performance or alleviate the detected problem or inefficiency, then the monitoring element 300 may undo the adjustment and/or attempt further adjustments according to similar techniques.

In another example, the monitoring element 300 may collect performance data from various points in the transmitting unit 21 and the pipeline 92, in particular, in an attempt to isolate operational problems. In this regard, as shown by block 502 of FIG. 11, the monitoring element 300 may request data indicative of at least one performance data indicative of at least one performance parameter (e.g., throughput) from multiple components of the pipeline 92. For illustrative purposes, assume that the monitoring element 300 requests data throughput information from the packetization logic 97 and interface logic 107. The monitoring element 300 may request that each such component track data throughput during the same particular time and provide information indicative of such throughput to the monitoring element 300. Alternatively, the monitoring element 300 may indicate, to each such component, to expect a certain amount of data from the synthetic producer 312 and to provide timing information on how long it takes the component to process the certain amount of data from the synthetic producer 312.

Figure 11:
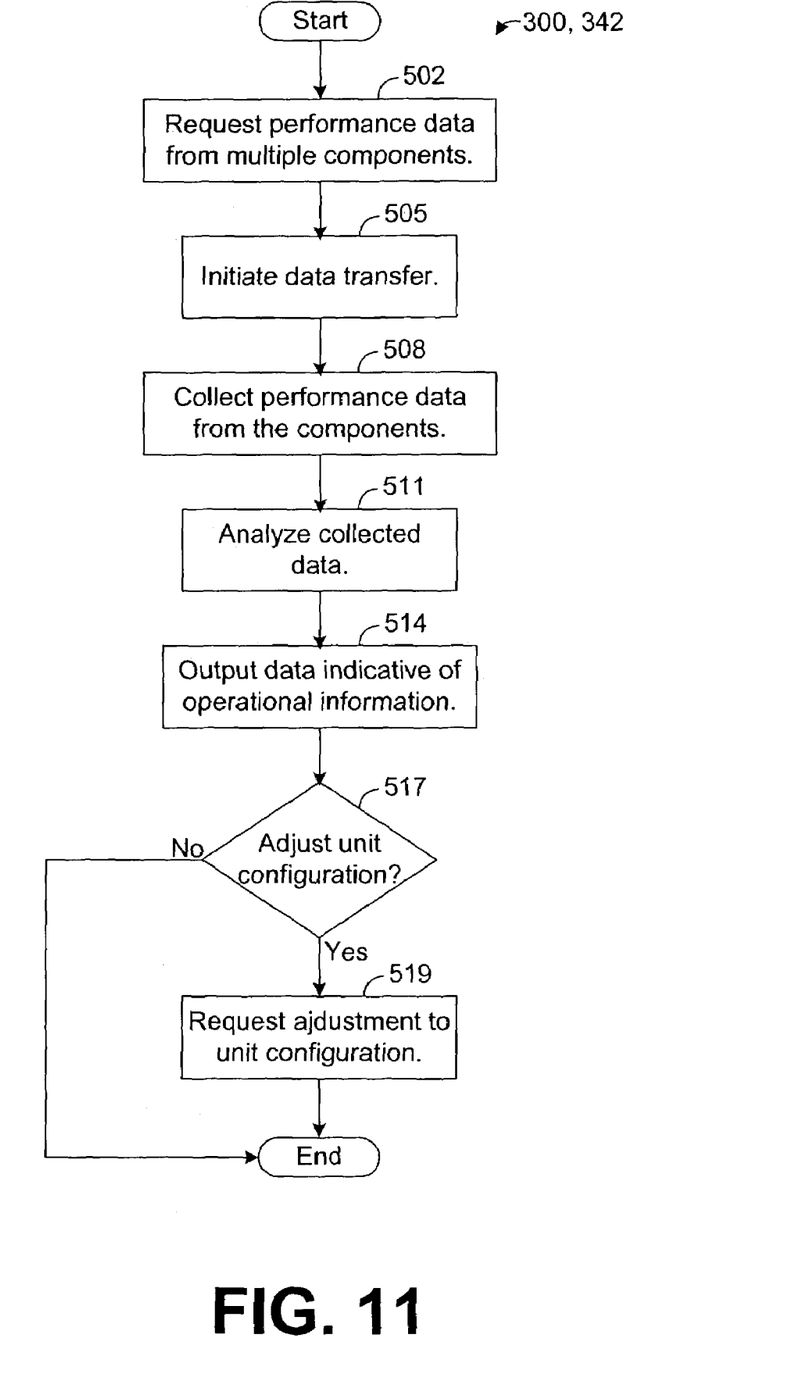
FIG. 11 is a flow chart illustrating another exemplary architecture and functionality of a monitoring element, such as is depicted in FIGS. 2 and 6.

In block 505, the monitoring element 300 instructs the synthetic producer 312 to initiate a data transfer of the certain amount of data described above. In response, the producer 312 produces the certain amount of data, which is handled by the packetization logic 97 and the interface logic 107 according to techniques described herein. In block 508 the monitoring element 300 collects the requested performance data from the packetization logic 97 and the interface logic 107. Such collected data may take various forms. For example, the data may indicate the amount of time it took each set of logic 97 and 107 to process the certain amount of data. Alternatively, the data may comprise a calculated data throughput values indicative of the respective processing rate of each set of logic 97 and 107. Other forms of such data are possible in other examples.

In block 511, the monitoring element 300 analyzes collected data and may isolate an operational problem based on the collected data. For example, the monitoring element 300 may determine that the data throughput of the packetization logic 97 is relatively high and that the data throughput of the interface logic 107 is relatively low. Such results may indicate an operational problem between the packetization logic 97 and the interface logic 107.

Moreover, in block 514, the monitoring element 300 outputs the collected data to a user and, in decision block 517, determines whether to make an adjustment of the configuration of the transmitting unit 21. If the monitoring element 300 can determine, based on the collected data, that an adjustment of the transmitting unit 21 may improve the performance or alleviate an operational problem of the unit 21, then the monitoring element 300 requests the adjustment in block 519. If an adjustment is indeed requested, then the monitoring element 300 may repeat the aforedescribed process and compare the results to determine whether the adjustment actually improved performance or alleviated an operational problem. If not, the monitoring element 300 may undo the adjustment or attempt another adjustment.

Note that the monitoring element 300 may dynamically collect performance information in the aforedescribed manner while the graphics applications 25 are running and are being serviced by various other communication sessions 39. By using a synthetic producer 312 and testing components allocated to such producer 312, the testing performed by the monitoring element 300 preferably does not have a substantial effect on the operational performance of the other applications 25. Further, the monitoring element 300 may make changes to the configuration of the transmitting unit 21, in an effort to improve the unit's performance, without significantly interrupting the operation of the graphics applications 25. In other words, the monitoring element 300, based on the information collected by it, may adjust the configuration of the transmitting element 21 "on the fly."

As an example, if the transmit monitoring element 300 determines, based on the information collected by it, that a detected operational problem may be alleviated or solved by adjusting the packet sizes of the packets produced by the transmitting unit 21, then the monitoring element 300 may notify the transport manager 36 of such a determination. In response, the transport manager 36 may adjust the settings of the communication sessions 39 such that the sizes of the packets packetized by the packetization logic 97 of each session 39 are adjusted in a desirable manner that generally improves the performance of the transmitting unit 21. In other examples, other parameters of the transmitting unit 21 may be adjusted based on the information provided by the monitoring element 300 in order to improve the performance of the transmitting unit 21.

It should be noted that similar monitoring and testing techniques may be employed at the receiving units 24 (FIG. 1). In this regard, as shown by FIG. 6, each receiving unit 24 preferably comprises a receive monitoring element 342 configured to test and monitor the components of the receiving unit 24 according to techniques similar to those employed by the transmit monitoring element 300. In particular, the receive monitoring element 342 may be configured to communicate with various components of the receiving unit 24 to determine data indicative of the performance of such components. Further, the monitoring element 342 may request at least one of the components to refrain from performing a task that it normally would perform during normal operation. For example, to isolate the testing of the receiver 111 from other components of the receiving unit 24, the monitoring element 342 may instruct the packet delivery logic 177 (FIG. 7) to discard data that the logic 177 would otherwise store in the shared resource 121 (FIG. 6). In another example, the monitoring element 342 may instruct a rendering session 123 to discard data that it would otherwise normally submit to a graphics accelerator 137.

To prevent the discarding of useful data from the graphics applications 25 (FIG. 2), the monitoring element 342 may be configured to create or otherwise provide a synthetic producer 345 to produce data that may be discarded similar to the synthetic producer 312 of FIG. 2. Further, when requesting a component of the receiving unit 24 to discard data, the monitoring element 342 may also instruct the receive logic 161 (FIG. 7) to receive data from the synthetic producer 345 rather than the network interface 110 coupled to it. Thus, any data discarded by the receiving unit 24 is preferably not useful data transmitted from the transmitting unit 21.

As an example, assume that it is desirable to determine the actual rate at which the receiver 111 is able to buffer data packets independent of the performance of the rest of the receiving unit 24. In such an example, the receive monitoring element 342 maybe configured to instruct the packet delivery logic 177 to refrain from storing data to the shared resource 121 (FIG. 6). Further, the monitoring element 342 may be configured to provide the synthetic producer 345 and to instruct the receive logic 161 to receive data from the synthetic producer 345 rather than the network interface 110. In such an example, data packets from the synthetic producer 345 are received by the receive logic 161. For each data packet, the receive logic 161 then pulls an entry 171 from the packet pointer pool 165 and stores the packet in the memory block 167 identified by the pulled entry 171. The receive logic 161 then inserts the pulled entry into the queue 173.

According to the techniques described above, the packet delivery logic 177 pulls entries 171 from the queue 173 and retrieves the data packets stored in the memory blocks 167 identified by these entries 171. However, rather than storing the retrieved data packets in the shared resource 121, the packet delivery logic 177, as instructed by the monitoring element 342, discards the retrieved packets and provides the receive monitoring element 342 with a value indicative of the rate at which the packet delivery logic 177 retrieves the data packets that are discarded by the packet delivery logic 177. The monitoring element 342 may then use the data provided by the packet delivery logic 177 to determine or report the operational status of the receiver 111. Further, the monitoring element 342 may use such data to diagnose or debug operational problems associated with the receiver 111.

To enable the monitoring element 342 to report operational status information, the receiving unit 24 may comprises an output device 352, such as a display device or printer. In this regard, similar to the transmit monitoring element 300, the receive monitoring element 342 may output data indicative of the operational state of the receiving unit 24 by rendering or otherwise transmitting such information to the output device 352, which then displays such data to a user.

It should be noted that monitoring and testing techniques may be employed within transmitting and receiving units having a configuration different than the configuration of the transmitting unit 21 and receiving units 24 described hereinabove. In addition, it is possible for a monitoring element 300 or 342 to reside external to the respective unit 21 or 24 being tested by the monitoring element 300 or 342.

For example, it is possible for the transmit monitoring element 300 to communicate with components of a receiving unit 24 in order to test and monitor the performance of the receiving unit 24, and it is possible for the receive monitoring element 342 to communicate with components of the transmitting unit 21 in order to test and monitor the performance of the transmitting unit 21. In such an embodiment, data from the synthetic producer 312 (FIG. 2) may be transmitted through the network 22 and discarded by a component of a receiving unit 24 for more precisely monitoring such component according to the techniques described hereinabove.

It should that it is not necessary for the steps of the exemplary methodologies depicted by FIGS. 10 and 11 to be formed in the depicted order. In this regard, the order of such steps may be rearranged from that shown in FIGS. 10 and 11 in various other embodiments of the present invention.

Now, therefore, the following is claimed:

1. An apparatus for communicating with a network, comprising:
    a data packet pipeline configured to transfer data between a buffer and a network socket, the pipeline having a first component and a second component; and
    a monitoring element configured to generate a first value indicative of an operational performance parameter for the first component while the second component is disabled, the monitoring element further configured to generate a second value indicative of the operational performance parameter for the first component while the second component is enabled and to isolate an operational problem within the pipeline based on a comparison of the first and second values.

2. The apparatus of claim 1, wherein the first value indicates a data throughput of the first component and the second value indicates a data throughput of the first component.

3. The apparatus of claim 1, wherein the monitoring element is configured to adjust a configuration of the apparatus based on the indication.

4. The apparatus of claim 1, wherein the monitoring element is configured to disable the second component.

5. The apparatus of claim 1, wherein the monitoring element is configured to cause the pipeline to discard a plurality of data packets flowing through the pipeline while the second component is disabled, wherein the first value is based on the plurality of data packets.

6. The apparatus of claim 1, wherein the second component is configured to receive a data packet transmitted by the first component.

7. An apparatus for communicating with a network, comprising:
    a data packet pipeline between a buffer and a network socket and defining a data path from the buffer to the network socket; and
    a monitoring element configured to disable a first portion of the pipeline from processing a plurality of data packets flowing through the pipeline, the monitoring element configured to monitor a second portion of the pipeline while the second portion is processing the plurality of data packets and the first portion is disabled, wherein the monitoring element is configured to determine whether disabling of the first portion by the monitoring element affects a data throughput of the second portion, wherein the first and second portions are within the data path.

8. The apparatus of claim 7, wherein the monitoring element is configured to cause the second pipeline portion to discard the plurality of data packets.

9. The apparatus of claim 7, wherein, due to disabling the first pipeline portion by the monitoring element, the plurality of data packets are prevented from reaching the network socket.

10. The apparatus of claim 7, wherein, due to disabling the first pipeline portion by the monitoring element, the plurality of data packets are prevented from reaching the buffer.

11. An apparatus for communicating with a network, comprising:
a data packet pipeline configured to transfer data between a buffer and a network socket; and
a monitoring element configured to disable a first portion of the pipeline from processing a plurality of data packets flowing through the pipeline, the monitoring element configured to monitor a second portion of the pipeline that is processing the plurality of data packets while the first portion is disabled,
wherein the monitoring element is configured to determine whether disabling of the first portion by the monitoring element affects a data throughput of the second portion, wherein the monitoring element is configured to determine a first value indicative of an operational performance of the second pipeline portion while the first pipeline portion is disabled and to determine a second value indicative of an operational performance of the second pipeline portion while the first pipeline portion is enabled, and wherein the monitoring element is further configured to isolate a communication problem within the pipeline by comparing the first and second values.

12. An apparatus for communicating with a network, comprising:
a data packet pipeline configured to transfer data between a buffer and a network socket; and
a monitoring element configured to cause a portion of the data packet pipeline to discard a plurality of data packets flowing through the pipeline thereby preventing the plurality of data packets from reaching a network component downstream of the pipeline portion, the monitoring element further configured to determine a value indicative of an operational performance of the pipeline in processing the plurality of packets, the monitoring element further configured to isolate a communication problem with the network component based on the value.

13. The apparatus of claim 12, wherein the monitoring element is configured to adjust a configuration of the data packet pipeline based on the value.

14. The apparatus of claim 12, wherein the monitoring element is configured to output the value.

15. The apparatus of claim 12, wherein the monitoring element is further configured to determine a value indicative of an operational performance of the pipeline in processing other packets, the monitoring element further configured to isolate the communication problem based on a comparison of the values.

16. An apparatus for communicating with a network, comprising:
pipeline means for transferring data between a buffer and a network socket, the pipeline means having a first component and a second component; and
monitoring means for generating a first value indicative of an operational performance parameter for the first component while the second component is disabled and for generating a second value indicative of the operational performance parameter for the first component while the second component is enabled, the monitoring means configured to isolate an operational problem within the pipeline based on a comparison of the first and second values.

17. A method for use in a network communication apparatus, comprising:
transferring data, via a data packet pipeline, between a buffer and a network socket;
monitoring the pipeline;
determining, based on the monitoring, a first value indicative of an operational performance parameter for a first component of the data packet pipeline while a second component of the data packet pipeline is disabled;
determining, based on the monitoring, a second value indicative of the operational performance parameter for the first component while the second component is enabled;
comparing the first and second values; and
isolating an operational problem within the pipeline based on the comparing.

18. The method of claim 17, further comprising:
disabling the second component from processing a plurality of data packets flowing through the pipeline; and
determining whether the disabling affects a data throughput of the first component.

19. The method of claim 17, further comprising:
causing the pipeline to discard at least one data packet flowing through the pipeline, wherein the first value is based on the one packet.

20. The method of claim 17, further comprising transmitting a data packet through the first and second components.

21. A method for use in a network communication apparatus, comprising:
transferring data, via a data packet pipeline, between a buffer and a network socket along a data path;
disabling a first portion of the pipeline from processing a plurality of data packets flowing through the pipeline;
monitoring a second portion of the pipeline that is processing the data packets during the disabling, wherein the first and second portions are within the data path; and
defining data that indicates whether the disabling affects a data throughput of the second pipeline portion.

22. The method of claim 21, further comprising communicating the defined data to a user.

23. The method of claim 21, further comprising adjusting a configuration of the pipeline based on the defined data.

24. The method of claim 21, further comprising causing the second pipeline portion to discard the data packets.

25. The method of claim 21, wherein, due to the disabling, the data packets are prevented from reaching the network socket.

26. The method of claim 21, wherein, due to the disabling, the data packets are prevented from reaching the buffer.

27. A method for use in a network communication apparatus, comprising:
transferring data, via a data packet pipeline, between a buffer and a network socket;
causing a portion of the pipeline to discard at least one data packet flowing through the pipeline thereby preventing the at least one data packet from reaching a network component downstream of the pipeline portion;
determining a value indicative of an operational performance of the pipeline in processing the one packet; and indicating a communication problem with the network component based on the value.

28. The method of claim 27, further comprising adjusting a configuration of the pipeline based on the value.

29. The method of claim 27, further comprising outputting data indicative of the value to a user of the apparatus.

30. The method of claim 27, further comprising:
determining a value indicative of an operational performance of the pipeline in processing other data packets;
comparing the values; and
isolating the communication problem based on the comparing.

* * * * *